US008880852B2

(12) United States Patent
Hickey et al.

(10) Patent No.: US 8,880,852 B2
(45) Date of Patent: Nov. 4, 2014

(54) DETECTING LOGICALLY NON-SIGNIFICANT OPERATION BASED ON OPCODE AND OPERAND AND SETTING FLAG TO DECODE ADDRESS SPECIFIED IN SUBSEQUENT INSTRUCTION AS DIFFERENT ADDRESS

(75) Inventors: Mark J. Hickey, Rochester, MN (US); Adam J. Muff, Rochester, MN (US); Matthew R. Tubbs, Rochester, MN (US); Charles D. Wait, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 435 days.

(21) Appl. No.: 13/281,958

(22) Filed: Oct. 26, 2011

(65) Prior Publication Data

US 2013/0111186 A1    May 2, 2013

(51) Int. Cl.
G06F 9/318    (2006.01)
G06F 9/00     (2006.01)
G06F 9/30     (2006.01)
G06F 9/34     (2006.01)

(52) U.S. Cl.
CPC ............. *G06F 9/00* (2013.01); *G06F 9/30145* (2013.01); *G06F 9/3016* (2013.01); *G06F 9/34* (2013.01); *G06F 9/30181* (2013.01)
USPC ................. 712/208; 712/E9.035; 712/E9.038

(58) Field of Classification Search
CPC ............ G06F 9/30181; G06F 9/30189; G06F 9/30185; G06F 9/30192; G06F 9/30196; G06F 9/30138; G06F 9/342
See application file for complete search history.

(56) References Cited

U.S. PATENT DOCUMENTS

| | | | |
|---|---|---|---|
| 6,651,160 B1 * | 11/2003 | Hays | 712/210 |
| 6,970,998 B1 * | 11/2005 | Favor | 712/226 |
| 7,373,483 B2 * | 5/2008 | Henry et al. | 712/210 |
| 8,521,989 B2 * | 8/2013 | Owens et al. | 712/10 |
| 2011/0047355 A1 * | 2/2011 | Mejdrich et al. | 712/208 |
| 2012/0166770 A1 * | 6/2012 | Smith et al. | 712/216 |

* cited by examiner

*Primary Examiner* — Kenneth Kim
(74) *Attorney, Agent, or Firm* — Wood, Herron & Evans, LLP

(57) ABSTRACT

A method, apparatus, and program product execute instructions of an instruction stream and detect logically non-significant operations in the instruction stream. Then, based on that detection, a target or source address of a subsequent instruction is adjusted. In some instances, doing so enables a greater number of addresses, e.g., registers, to be accessed in a given number of bit positions within an instruction format.

25 Claims, 7 Drawing Sheets

DETECTING LOGICALLY NON-SIGNIFICANT OPERATION BASED ON OPCODE AND OPERAND AND SETTING FLAG TO DECODE ADDRESS SPECIFIED IN SUBSEQUENT INSTRUCTION AS DIFFERENT ADDRESS

FIELD OF THE INVENTION

The invention is generally related to data processing, and in particular to processor architectures and execution units incorporated therein.

BACKGROUND OF THE INVENTION

The fundamental task of every processor is to execute programs. How a processor handles this task, and how the programs must present themselves to the processor for execution, are governed by an instruction set architecture ("ISA") and the microarchitecture of the processor. An ISA is analogous to a programming model and relates principally to how instructions in a program should be formatted in order to be properly decoded and executed by the processor, although an ISA may also specify other aspects of the processor, such as native data types, registers, addressing modes, memory architecture, interrupt and exception handling, and external I/O. The microarchitecture principally governs lower level details regarding how instructions are decoded and executed, including the constituent parts of the processor (e.g., the execution units, such as fixed and floating point execution units) and how these interconnect and interoperate to implement the processor's architectural specification.

An ISA typically includes a specification of the format of each type of instruction that is capable of being executed by a particular processor design. Typically, an instruction will be encoded to include an operational code ("opcode") that identifies the type of instruction, as well as one or more operands that identify input and/or output data to be processed by the instruction. In many processor designs, such as Reduced Instruction Set Computer ("RISC") designs and other load-store designs, data is principally manipulated within a set of general purpose registers (GPR's) (often referred to as a register file), with load and store instructions used to respectively retrieve input data into a GPR from memory and store result or output data from the GPR back to memory. Thus, for a majority of the instructions that manipulate data, the instructions specify one or more input or source registers from which input data is retrieved (such as through the use of source addresses specifying target locations of the register files from which to retrieve data), and an output or destination register, which may be the same as one or more of the input or source registers, to which data is written (such as through the use of a target address specifying a target location of the register file from which to write data).

Instructions are typically defined in an ISA to be a fixed size, such as 32 bits or 64 bits wide. While multiple 32 or 64 bit values may be used to specify an instruction, the use of multiple values is undesirable because the multiple values take more time to propagate through the processor and significantly increase design complexity. With these fixed instruction widths, only a limited number of bits are available for use as opcodes and operands.

Each unique instruction type conventionally requires a unique opcode, so in order to support a greater number of instruction types (a continuing need in the industry), additional bits often must be allocated to the opcode portion of an instruction architecture. In some instances, opcodes may be broken into primary and secondary opcodes, with the primary opcode defining an instruction type and the secondary opcode defining a subtype for a particular instruction type. However, even when primary and secondary opcodes are used, both occupy bit positions within the instruction.

Likewise, a continuing need exists for expanding the number of registers supported by an ISA, since improvements in fabrication technology continue to enable greater numbers of registers to be architected into an integrated circuit, and in general performance improves as the number of registers increases. Each register requires a unique identifier as well, so as the number of registers increases, the number of bit positions in each instruction required to identify all supported registers likewise increases.

As an example, consider a processor architecture that supports 32-bit instructions with 6-bit primary opcode fields, and thus that supports a total of 64 types, or classes, or instructions. If, for example, it is desirable to implement within this architecture a class of instructions that identifies up to three source registers (also referred to as source addresses) and a separate destination register (also referred to as a target address) from a register file of 64 registers, or addresses, each address requires a 6-bit field. As such, 6 bits are needed for the primary opcode, 18 bits are needed for the source addresses, and 6 bits are needed for the target address, leaving only two bits for an extended opcode. This allows for only four possible instructions in this instruction class. However, in the event that the register file has 128 registers, or entries, each address requires a 7-bit field. As such, the primary opcode must be reduced to 4 bits, 21 bits are needed for the source addresses, 7 bits are needed for the target address, and no bits are available for an extended opcode. This results in a drastically reduced number of opcodes available for use to perform operations.

In most instances, however, more instructions types are needed for an architecture to be useful. For example, an instruction class for performing floating point operations may need instruction types that perform addition, subtraction, multiplication, fused multiply-add operations, division, exponentiation, trigonometric operations, comparison operations, and others.

Conventional attempts have been made to address these limitations. For example, three-source operations may be made destructive, meaning that the target and one source address would be implicitly equal, such that one address field in the above example would not be needed, freeing up space for additional extended opcodes. Destructive operations, however, are not convenient for compilers and software engineers, because often an extra copy of the source data that would be overwritten by the destructive operation needs to be saved away in a temporary register, which can have performance problems in addition to using valuable temporary register space.

Therefore, a significant need continues to exist in the art for a manner of increasing the number and complexity of instructions supported by an instruction set architecture.

SUMMARY OF THE INVENTION

The invention addresses these and other problems associated with the prior art by providing a method, apparatus, and program product that detect logically non-significant operations (LNSO's) in an instruction stream, which includes operations that do not change data values sourced and/or targeted thereby, and adjusts a target and/or source address of a subsequent instruction in the instruction stream based at least in part on the detection. For example, an instruction for execution is typically a set length that may include an operational code (opcode), where the opcode indicates an operation to perform, and the instruction may further include one or more source addresses that indicate one or more respective addresses in a register file from which values may be retrieved to use in the operation and a target address that indicates an address in the register file at which to store the results of the operation. This register file, however, may include 128 or more values at 128 or more respective addresses, and hence seven or more bits may be required to address all the addresses of the register file, which may restrict the amount of bits available for the opcodes and/or secondary opcodes. Embodiments of the invention utilize instructions with shortened addresses that may be decoded into their longer form prior to execution. In response to detecting an instruction which performs a logically non-significant operation, a fixed value may be added or appended to the shortened addresses as the most significant bits of the addresses to generate substitute addresses. The fixed value may be determined in response to the LNSO or, alternatively, with respect to data associated with the logically non-significant operation.

Thus, embodiments consistent with the invention include a method to execute instructions in an instruction stream. The method includes receiving a first instruction of the instruction stream, wherein the first instruction is configured to perform a logically non-significant operation. In response to determining that the first instruction is configured to perform a logically non-significant operation, a first address identified by a second instruction of the instruction stream that is received subsequent to the first instruction is decoded as a second address that is different from the first address.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1:
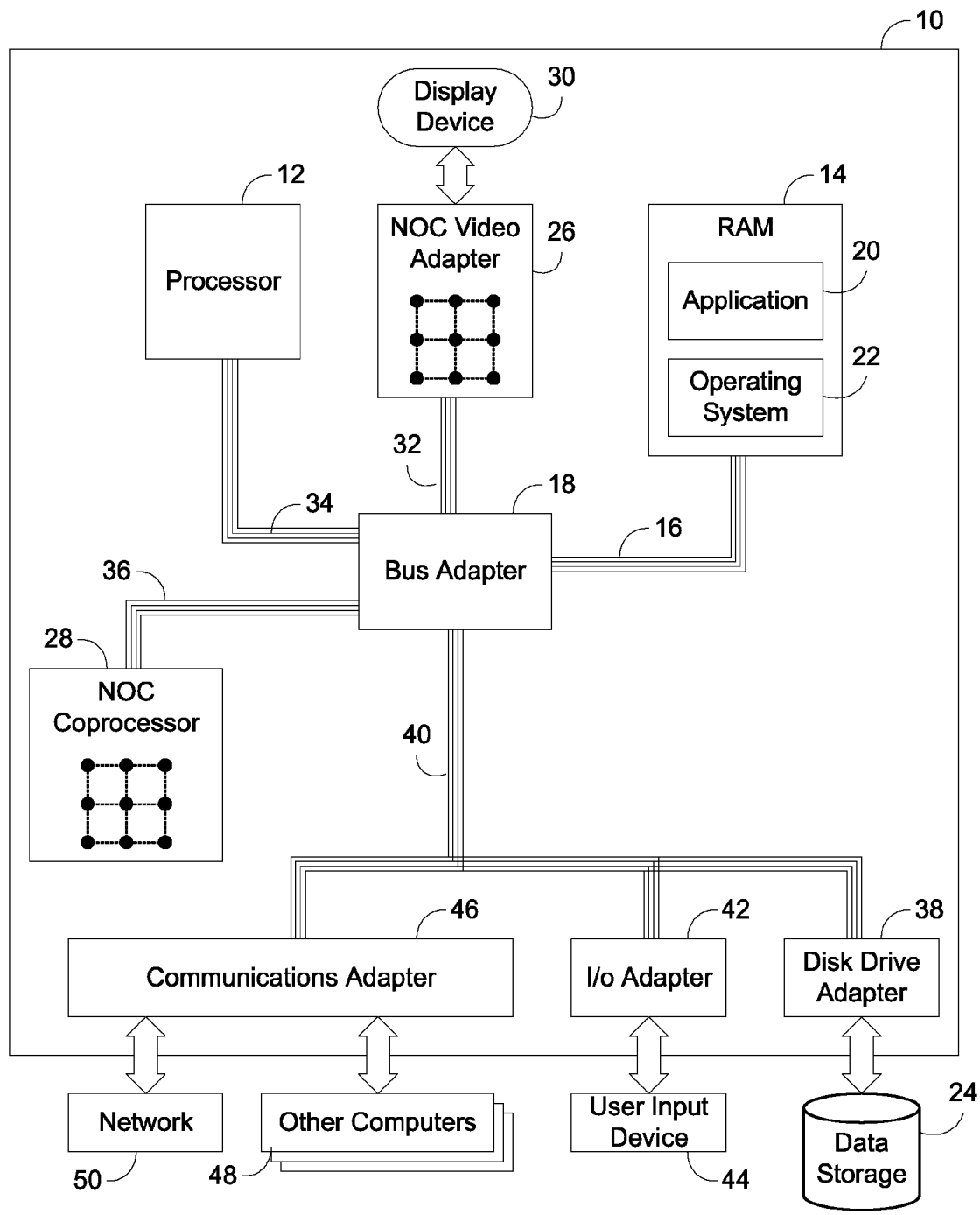
FIG. 1 is a block diagram of exemplary automated computing machinery including an exemplary computer useful in data processing consistent with embodiments of the present invention.

Embodiments consistent with the invention detect logically non-significant operations corresponding to instructions in an instruction stream, where the logically non-significant operations may include operations that do not change data values targeted and/or sourced by an instruction, and some embodiments may adjust a target or source register address of a subsequent instruction based at least in part on that detection. In some embodiments, such as when addresses of instructions are shortened by removal of one most significant bit, decode logic within an execution unit is configured to adjust a register address in an instruction that follows an instruction corresponding to a logically non-significant operation by adding the corresponding bit back to the addresses of the instruction prior to the execution thereof. In alternative embodiments, such as when register addresses of instructions are shortened by removal of the two most significant bits, decode logic within the execution unit is configured to adjust an instruction in an instruction stream that follows an instruction corresponding to a logically non-significant operation by adding the two corresponding bits back to the addresses of the registers prior to the execution thereof. As such, in some embodiments, fixed-length instructions may include register addresses in a shortened format to free up space for primary or secondary opcodes, but may be executed with lengthened addresses.

In some embodiments, the decode logic may be configured to increment an address data structure by a fixed amount each time that a logically non-significant operation is detected. For example, the address data structure may store one or more bits that are capable of being used as the most significant bits of addresses. Each time a logically non-significant operation is detected, the address data structure may be incremented by one. When the fixed value in the address data structure is appended as the most significant bit(s) to the target address and/or source addresses, or added as a fixed value to the target address and/or source addresses, the target address and/or source addresses may be adjusted to target new addresses at new entries of a register file, or new addresses at a new bank of the register file.

In alternative embodiments, the decode logic may be configured to analyze the logically non-significant operation and the address data structure may be configured as a table including data indicating multiple fixed values that may be used to adjust the target address and/or source addresses of an instruction. As such, the decode logic may be configured to determine an opcode associated with the logically non-significant operation. The address data structure may then be accessed or searched for an entry that includes the determined opcode. In response to locating the desired entry, data indicating how to change the target address and/or source addresses of a subsequent instruction may be retrieved, and the target address and/or source addresses of the subsequent instruction may be adjusted correspondingly. In some embodiments, the address data structure may indicate a fixed value to append or add as the most significant bits to the target address and/or source addresses of the subsequent instruction, while in alternative embodiments the address data structure indicates the target address and/or source addresses that are used to replace those of the subsequent instruction.

Embodiments of the invention therefore receive a first instruction of an instruction stream which performs a logically non-significant operation. In response to determining that the first instruction performs a logically non-significant operation, a first address identified by a second instruction, which may or may not be the next instruction in the instruction stream and is received subsequent to the first instruction, is decoded as a second address that is different from the first address.

Other variations and modifications will be apparent to one of ordinary skill in the art. Therefore, the invention is not limited to the specific implementations discussed herein.

Hardware and Software Environment

Now turning to the drawings, wherein like numbers denote like parts throughout the several views, FIG. 1 illustrates exemplary automated computing machinery including an exemplary computer 10 useful in data processing consistent with embodiments of the present invention. Computer 10 of FIG. 1 includes at least one computer processor 12 or 'CPU' as well as random access memory 14 ('RAM'), which is connected through a high speed memory bus 16 and bus adapter 18 to processor 12 and to other components of the computer 10.

Stored in RAM 14 is an application program 20, a module of user-level computer program instructions for carrying out particular data processing tasks such as, for example, word processing, spreadsheets, database operations, video gaming, stock market simulations, atomic quantum process simulations, or other user-level applications. Also stored in RAM 14 is an operating system 22. Operating systems useful in connection with embodiments of the invention include UNIX™, Linux™, Microsoft Windows XP™, AIX™, IBM's i5/OS™, and others as will occur to those of skill in the art. Operating system 22 and application 20 in the example of FIG. 1 are shown in RAM 14, but many components of such software typically are stored in non-volatile memory also, e.g., on a disk drive 24.

As will become more apparent below, embodiments consistent with the invention may be implemented within Network On Chip (NOC) integrated circuit devices, or chips, and as such, computer 10 is illustrated including two exemplary NOCs: a video adapter 26 and a coprocessor 28. NOC video adapter 26, which may alternatively be referred to as a graphics adapter, is an example of an I/O adapter specially designed for graphic output to a display device 30 such as a display screen or computer monitor. NOC video adapter 26 is connected to processor 12 through a high speed video bus 32, bus adapter 18, and the front side bus 34, which is also a high speed bus. NOC Coprocessor 28 is connected to processor 12 through bus adapter 18, and front side buses 34 and 36, which is also a high speed bus. The NOC coprocessor of FIG. 1 may be optimized, for example, to accelerate particular data processing tasks at the behest of the main processor 12.

The exemplary NOC video adapter 26 and NOC coprocessor 28 of FIG. 1 each include a NOC, including integrated processor ('IP') blocks, routers, memory communications controllers, and network interface controllers, the details of which will be discussed in greater detail below in connection with FIGS. 2-3. The NOC video adapter and NOC coprocessor are each optimized for programs that use parallel processing and also require fast random access to shared memory. It will be appreciated by one of ordinary skill in the art having the benefit of the instant disclosure, however, that the invention may be implemented in devices and device architectures other than NOC devices and device architectures. The invention is therefore not limited to implementation within an NOC device.

Computer 10 of FIG. 1 includes disk drive adapter 38 coupled through an expansion bus 40 and bus adapter 18 to processor 12 and other components of the computer 10. Disk drive adapter 38 connects non-volatile data storage to the computer 10 in the form of disk drive 24, and may be implemented, for example, using Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

Computer 10 also includes one or more input/output ('I/O') adapters 42, which implement user-oriented input/output through, for example, software drivers and computer hardware for controlling output to display devices such as computer display screens, as well as user input from user input devices 44 such as keyboards and mice. In addition, computer 10 includes a communications adapter 46 for data communications with other computers 48 and for data communications with a data communications network 50. Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters suitable for use in computer 10 include modems for wired dial-up communications, Ethernet (IEEE 802.3) adapters for wired data communications network communications, and 802.11 adapters for wireless data communications network communications.

Figure 2:
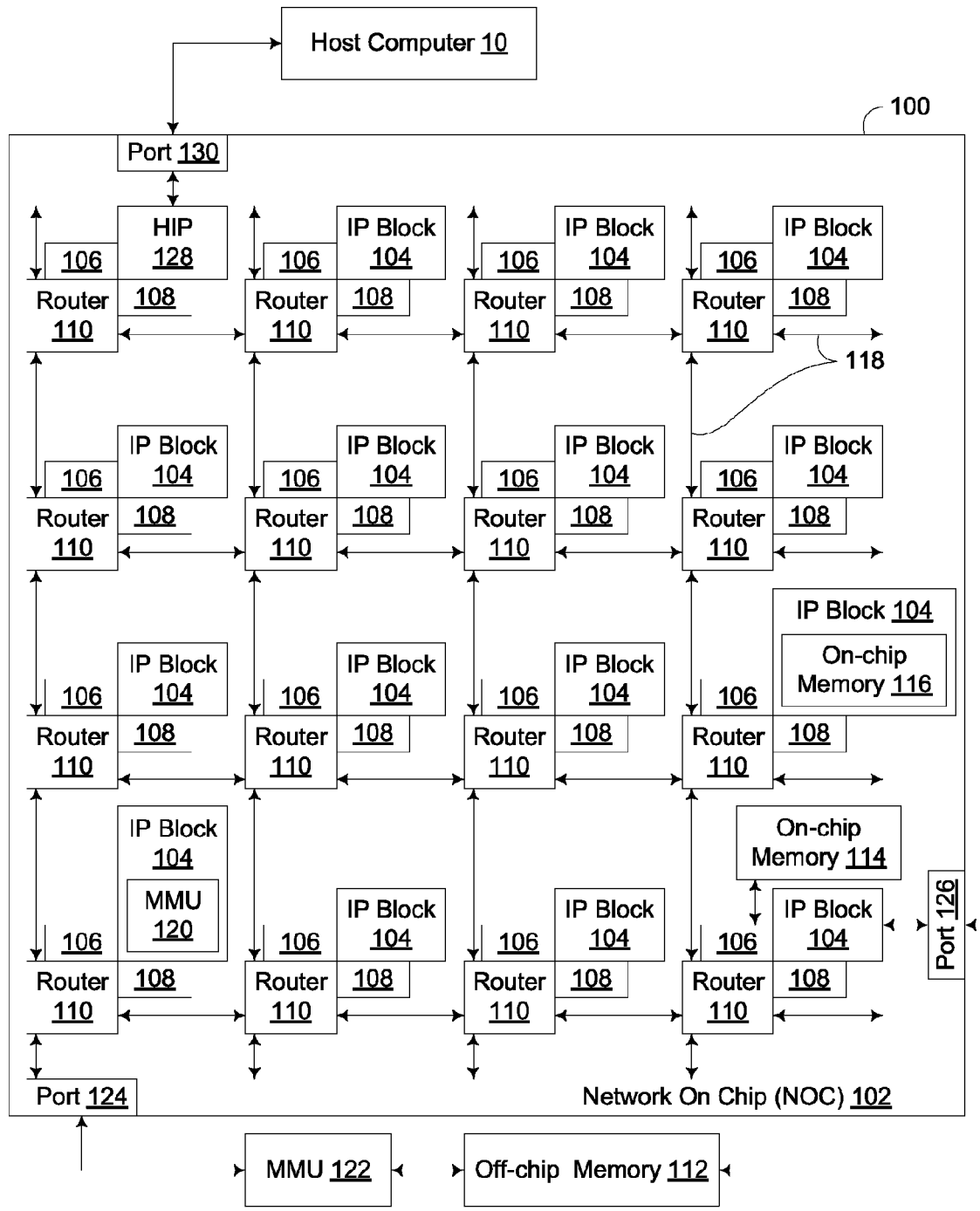
FIG. 2 is a block diagram of an exemplary NOC implemented in the computer of FIG. 1.

For further explanation, FIG. 2 sets forth a functional block diagram of an example NOC 102 according to embodiments of the present invention. The NOC in FIG. 2 is implemented on a 'chip' 100, that is, on an integrated circuit. NOC 102 includes integrated processor ('IP') blocks 104, routers 110, memory communications controllers 106, and network interface controllers 108 grouped into interconnected nodes. Each IP block 104 is adapted to a router 110 through a memory communications controller 106 and a network interface controller 108. Each memory communications controller controls communications between an IP block and memory, and each network interface controller 108 controls inter-IP block communications through routers 110.

In NOC 102, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs consistent with embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well. It will also be appreciated that IP blocks, as well as other logic circuitry implemented consistent with the invention may be distributed in the form of computer data files, e.g., logic definition program code, that define at various levels of detail the functionality and/or layout of the circuit arrangements implementing such logic. Thus, while the invention has and hereinafter will be described in the context of circuit arrangements implemented in fully functioning integrated circuit devices, data processing systems utilizing such devices, and other tangible, physical hardware circuits, those of ordinary skill in the art having the benefit of the instant disclosure will appreciate that the invention may also be implemented within a program product, and that the invention applies equally regardless of the particular type of computer readable storage medium being used to distribute the program product. Examples of computer readable storage media include, but are not limited to, physical, recordable type media such as volatile and non-volatile memory devices, floppy disks, hard disk drives, CD-ROMs, and DVDs (among others).

Each IP block 104 in the example of FIG. 2 is adapted to a router 110 through a memory communications controller 106. Each memory communication controller is an aggregation of synchronous and asynchronous logic circuitry adapted to provide data communications between an IP block and memory. Examples of such communications between IP blocks and memory include memory load instructions and memory store instructions. The memory communications controllers 106 are described in more detail below with reference to FIG. 3. Each IP block 104 is also adapted to a router 110 through a network interface controller 108, which controls communications through routers 110 between IP blocks 104. Examples of communications between IP blocks include messages carrying data and instructions for processing the data among IP blocks in parallel applications and in pipelined applications. The network interface controllers 108 are also described in more detail below with reference to FIG. 3.

Routers 110, and the corresponding links 118 therebetween, implement the network operations of the NOC. The links 118 may be packet structures implemented on physical, parallel wire buses connecting all the routers. That is, each link may be implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wide, 512 wires. In addition, each link may be bi-directional, so that if the link packet structure includes 64 bytes, the wire bus actually contains 1024 wires between each router and each of its neighbors in the network. In such an implementation, a message could include more than one packet, but each packet would fit precisely onto the width of the wire bus. In the alternative, a link may be implemented on a wire bus that is only wide enough to accommodate a portion of a packet, such that a packet would be broken up into multiple beats, e.g., so that if a link is implemented as 16 bytes in width, or 128 wires, a 64 byte packet could be broken into four beats. It will be appreciated that different implementations may used different bus widths based on practical physical limits as well as desired performance characteristics. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller 106 controls communications between an IP block and memory. Memory can include off-chip main RAM 112, memory 114 connected directly to an IP block through a memory communications controller 106, on-chip memory enabled as an IP block 116, and on-chip caches. In NOC 102, either of the on-chip memories 114, 116, for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. Memory 116 on an IP block can be addressed from that IP block or from any other IP block in the NOC. Memory 114 attached directly to a memory communication controller can be addressed by the IP block that is adapted to the network by that memory communication controller—and can also be addressed from any other IP block anywhere in the NOC.

NOC 102 includes two memory management units ('MMUs') 120, 122, illustrating two alternative memory architectures for NOCs consistent with embodiments of the present invention. MMU 120 is implemented within an IP block, allowing a processor within the IP block to operate in virtual memory while allowing the entire remaining architecture of the NOC to operate in a physical memory address space. MMU 122 is implemented off-chip, connected to the NOC through a data communications port 124. The port 124 includes the pins and other interconnections required to conduct signals between the NOC and the MMU, as well as sufficient intelligence to convert message packets from the NOC packet format to the bus format required by the external MMU 122. The external location of the MMU means that all processors in all IP blocks of the NOC can operate in virtual memory address space, with all conversions to physical addresses of the off-chip memory handled by the off-chip MMU 122.

In addition to the two memory architectures illustrated by use of the MMUs 120, 122, data communications port 126 illustrates a third memory architecture useful in NOCs capable of being utilized in embodiments of the present invention. Port 126 provides a direct connection between an IP block 104 of the NOC 102 and off-chip memory 112. With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port

126. The port 126 includes the pins and other interconnections required to conduct signals between the NOC and the off-chip memory 112, as well as sufficient intelligence to convert message packets from the NOC packet format to the bus format required by the off-chip memory 112.

In the example of FIG. 2, one of the IP blocks is designated a host interface processor 128. A host interface processor 128 provides an interface between the NOC and a host computer 10 in which the NOC may be installed and also provides data processing services to the other IP blocks on the NOC, including, for example, receiving and dispatching among the IP blocks of the NOC data processing requests from the host computer. A NOC may, for example, implement a video graphics adapter 26 or a coprocessor 28 on a larger computer 10 as described above with reference to FIG. 1. In the example of FIG. 2, the host interface processor 128 is connected to the larger host computer through a data communications port 130. The port 130 includes the pins and other interconnections required to conduct signals between the NOC and the host computer, as well as sufficient intelligence to convert message packets from the NOC to the bus format required by the host computer 10. In the example of the NOC coprocessor in the computer of FIG. 1, such a port would provide data communications format translation between the link structure of the NOC coprocessor 28 and the protocol required for the front side bus 36 between the NOC coprocessor 28 and the bus adapter 18.

Figure 3:
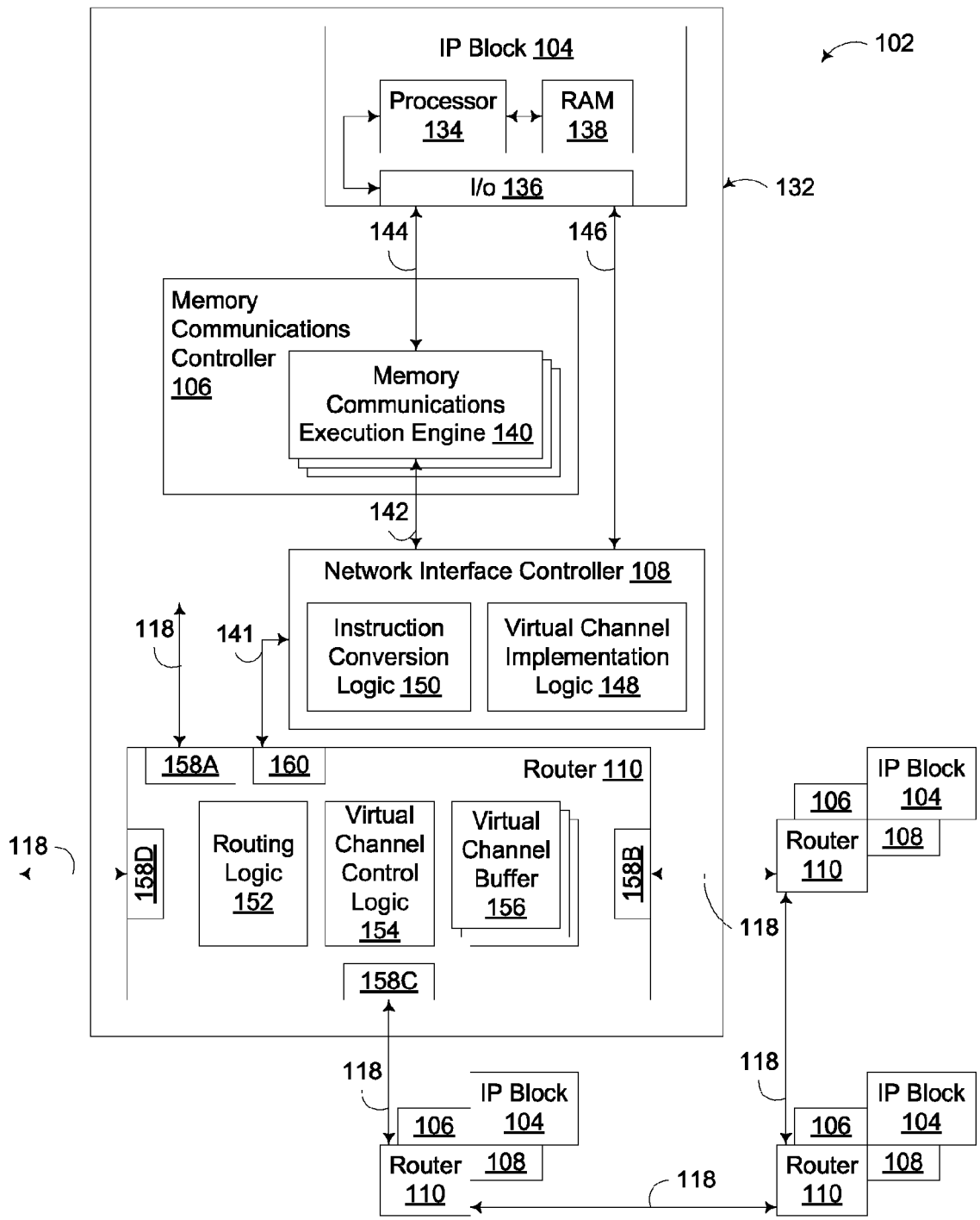
FIG. 3 is a block diagram illustrating in greater detail an exemplary implementation of a node from the NOC of FIG. 2.

FIG. 3 next illustrates a functional block diagram illustrating in greater detail the components implemented within an IP block 104, memory communications controller 106, network interface controller 108 and router 110 in NOC 102, collectively illustrated at 132. IP block 104 includes a computer processor 134 and I/O functionality 136. In this example, computer memory is represented by a segment of random access memory ('RAM') 138 in IP block 104. The memory, as described above with reference to FIG. 2, can occupy segments of a physical address space whose contents on each IP block are addressable and accessible from any IP block in the NOC. The processors 134, I/O capabilities 136, and memory 138 in each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In NOC 102 of FIG. 3, each memory communications controller 106 includes a plurality of memory communications execution engines 140. Each memory communications execution engine 140 is enabled to execute memory communications instructions from an IP block 104, including bidirectional memory communications instruction flow 141, 142, 144 between the network and the IP block 104. The memory communications instructions executed by the memory communications controller may originate, not only from the IP block adapted to a router through a particular memory communications controller, but also from any IP block 104 anywhere in NOC 102. That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine 140 is enabled to execute a complete memory communications instruction separately and in parallel with other memory communications execution engines. The memory communications execution engines implement a scalable memory transaction processor optimized for concurrent throughput of memory communications instructions. Memory communications controller 106 supports multiple memory communications execution engines 140 all of which run concurrently for simultaneous execution of multiple memory communications instructions. A new memory communications instruction is allocated by the memory communications controller 106 to a memory communications engine 140 and memory communications execution engines 140 can accept multiple response events simultaneously. In this example, all of the memory communications execution engines 140 are identical. Scaling the number of memory communications instructions that can be handled simultaneously by a memory communications controller 106, therefore, is implemented by scaling the number of memory communications execution engines 140.

In NOC 102 of FIG. 3, each network interface controller 108 is enabled to convert communications instructions from command format to network packet format for transmission among the IP blocks 104 through routers 110. The communications instructions may be formulated in command format by the IP block 104 or by memory communications controller 106 and provided to the network interface controller 108 in command format. The command format may be a native format that conforms to architectural register files of IP block 104 and memory communications controller 106. The network packet format is typically the format required for transmission through routers 110 of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In NOC 102 of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. Thus, in NOC 102, all memory-address-based communications that are executed with message traffic are passed from the memory communications controller to an associated network interface controller for conversion from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller 106 is naturally also the network location of that memory communication controller's associated router 110, network interface controller 108, and IP block 104. The instruction conversion logic 150 within each network interface controller is capable of converting memory addresses to network addresses for purposes of transmitting memory-address-based communications through routers of a NOC.

Upon receiving message traffic from routers 110 of the network, each network interface controller 108 inspects each packet for memory instructions. Each packet containing a memory instruction is handed to the memory communications controller 106 associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In NOC 102 of FIG. 3, each IP block 104 is enabled to bypass its memory communications controller 106 and send inter-IP block, network-addressed communications 146 directly to the network through the IP block's network interface controller 108. Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through I/O functions 136 directly to the IP block's network interface controller in command format, then converted to packet format by the network interface controller and transmitted through routers of the NOC to another IP block. Such network-addressed communications 146 are bi-directional, potentially proceeding to and from each IP block of the NOC, depending on their use in any particular application. Each network interface controller, however, is enabled to both send and receive such communications to and from an associated router, and each network interface controller is enabled to both send and receive such communications directly to and from an associated IP block, bypassing an associated memory communications controller 106.

Each network interface controller 108 in the example of FIG. 3 is also enabled to implement virtual channels on the network, characterizing network packets by type. Each network interface controller 108 includes virtual channel implementation logic 148 that classifies each communication instruction by type and records the type of instruction in a field of the network packet format before handing off the instruction in packet form to a router 110 for transmission on the NOC. Examples of communication instruction types include inter-IP block network-address-based messages, request messages, responses to request messages, invalidate messages directed to caches; memory load and store messages; and responses to memory load messages, etc.

Each router 110 in the example of FIG. 3 includes routing logic 152, virtual channel control logic 154, and virtual channel buffers 156. The routing logic typically is implemented as a network of synchronous and asynchronous logic that implements a data communications protocol stack for data communication in the network formed by the routers 110, links 118, and bus wires among the routers. Routing logic 152 includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed.

In describing memory-address-based communications above, each memory address was described as mapped by network interface controllers to a network address, a network location of a memory communications controller. The network location of a memory communication controller 106 is naturally also the network location of that memory communication controller's associated router 110, network interface controller 108, and IP block 104. In inter-IP block, or network-address-based communications, therefore, it is also typical for application-level data processing to view network addresses as the location of an IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x, y coordinates of each such set in the mesh.

In NOC 102 of FIG. 3, each router 110 implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router 110 in the example of FIG. 3 also includes virtual channel control logic 154 and virtual channel buffers 156. The virtual channel control logic 154 examines each received packet for its assigned communications type and places each packet in an outgoing virtual channel buffer for that communications type for transmission through a port to a neighboring router on the NOC.

Each virtual channel buffer 156 has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer 156 in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller 108. Each network interface controller is configured to, upon receipt of such a signal, refuse to accept, from its associated memory communications controller 106 or from its associated IP block 104, communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped. When a router encounters a situation in which a packet might be dropped in some unreliable protocol such as, for example, the Internet Protocol, the routers in the example of FIG. 3 may suspend by their virtual channel buffers 156 and their virtual channel control logic 154 all transmissions of packets in a virtual channel until buffer space is again available, eliminating any need to drop packets. The NOC of FIG. 3, therefore, may implement highly reliable network communications protocols with an extremely thin layer of hardware.

The example NOC of FIG. 3 may also be configured to maintain cache coherency between both on-chip and off-chip memory caches. Each NOC can support multiple caches each of which operates against the same underlying memory address space. For example, caches may be controlled by IP blocks, by memory communications controllers, or by cache controllers external to the NOC. Either of the on-chip memories 114, 116 in the example of FIG. 2 may also be implemented as an on-chip cache, and, within the scope of the present invention, cache memory can be implemented off-chip also.

Each router 110 illustrated in FIG. 3 includes five ports, four ports 158A-D connected through bus wires 118 to other routers and a fifth port 160 connecting each router to its associated IP block 104 through a network interface controller 108 and a memory communications controller 106. As can be seen from the illustrations in FIGS. 2 and 3, the routers 110 and the links 118 of the NOC 102 form a mesh network with vertical and horizontal links connecting vertical and horizontal ports in each router. In the illustration of FIG. 3, for example, ports 158A, 158C and 160 are termed vertical ports, and ports 158B and 158D are termed horizontal ports.

Figure 4:
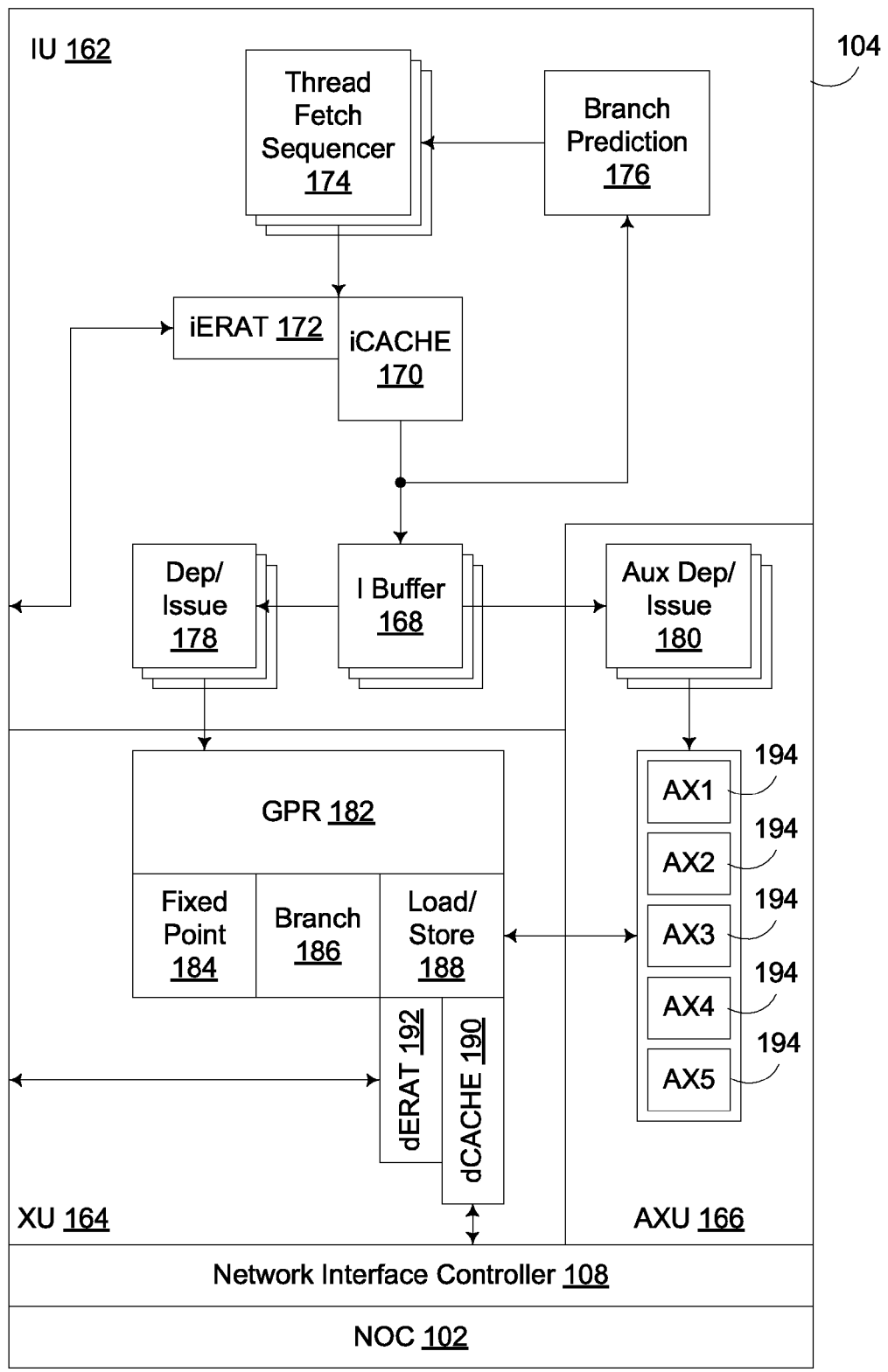
FIG. 4 is a block diagram illustrating an exemplary implementation of an IP block from the NOC of FIG. 2.

FIG. 4 next illustrates in another manner one exemplary implementation of an IP block 104 consistent with the invention, implemented as a processing element partitioned into an instruction unit (IU) 162, execution unit (XU) 164 and auxiliary execution unit (AXU) 166. In the illustrated implementation, IU 162 includes a plurality of instruction buffers 168 that receive instructions from an L1 instruction cache (iCACHE) 170. Each instruction buffer 168 is dedicated to one of a plurality, e.g., four, symmetric multithreaded (SMT) hardware threads. An effective-to-real translation unit (iERAT) 172 is coupled to iCACHE 170, and is used to translate instruction fetch requests from a plurality of thread fetch sequencers 174 into real addresses for retrieval of instructions from lower order memory. Each thread fetch sequencer 174 is dedicated to a particular hardware thread, and is used to ensure that instructions to be executed by the associated thread is fetched into the iCACHE for dispatch to the appropriate execution unit. As also shown in FIG. 4, instructions fetched into instruction buffer 168 may also be monitored by branch prediction logic 176, which provides hints to each thread fetch sequencer 174 to minimize instruction cache misses resulting from branches in executing threads.

IU 162 also includes a dependency/issue logic block 178 dedicated to each hardware thread, and configured to resolve dependencies and control the issue of instructions from instruction buffer 168 to XU 164. In addition, in the illustrated embodiment, separate dependency/issue logic 180 is provided in AXU 166, thus enabling separate instructions to be concurrently issued by different threads to XU 164 and AXU 166. In an alternative embodiment, logic 180 may be disposed in IU 162, or may be omitted in its entirety, such that logic 178 issues instructions to AXU 166.

XU 164 is implemented as a fixed point execution unit, including a set of general purpose registers (GPR's) 182 coupled to fixed point logic 184, branch logic 186 and load/store logic 188. Load/store logic 188 is coupled to an L1 data cache (dCACHE) 190, with effective to real translation provided by dERAT logic 192. XU 164 may be configured to implement practically any instruction set, e.g., all or a portion of a 32 b or 64 b PowerPC instruction set.

AXU 166 operates as an auxiliary execution unit including dedicated dependency/issue logic 180 along with one or more execution blocks 194. AXU 166 may include any number of execution blocks, and may implement practically any type of execution unit, e.g., a floating point unit, or one or more specialized execution units such as encryption/decryption units, coprocessors, vector processing units, graphics processing units, XML processing units, etc. In the illustrated embodiment, AXU 166 includes a high speed auxiliary interface to XU 164, e.g., to support direct moves between AXU architected state and XU architected state.

Communication with IP block 104 may be managed in the manner discussed above in connection with FIG. 2, via network interface controller 108 coupled to NOC 102. Address-based communication, e.g., to access L2 cache memory, may be provided, along with message-based communication. For example, each IP block 104 may include a dedicated in box and/or out box in order to handle inter-node communications between IP blocks.

Embodiments of the present invention may be implemented within the hardware and software environment described above in connection with FIGS. 1-4. However, it will be appreciated by one of ordinary skill in the art having the benefit of the instant disclosure that the invention may be implemented in a multitude of different environments, and that other modifications may be made to the aforementioned hardware and software embodiment without departing from the spirit and scope of the invention. As such, the invention is not limited to the particular hardware and software environment disclosed herein.

Logically Non-Significant Operation Dependent Instruction Decode

Figure 5:
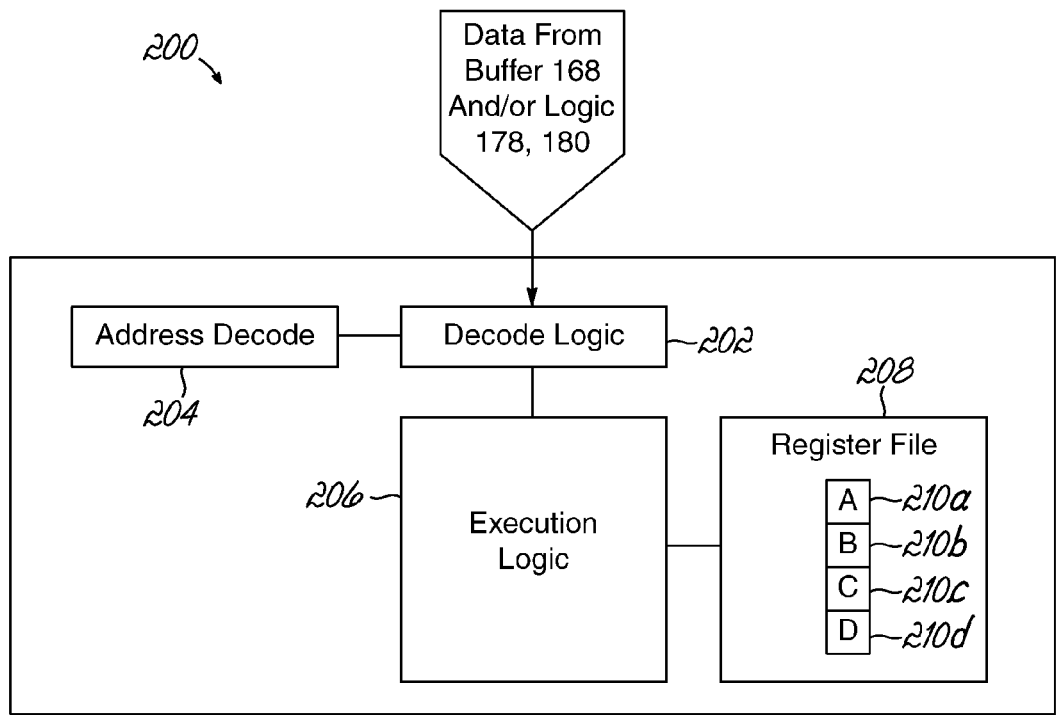
FIG. 5 is a block diagram of an execution unit supporting detection of logically non-significant operations and adjustment of addresses in response thereto within an IP block from the NOC of FIG. 2.

Turning now to FIG. 5, this illustrates an exemplary hardware thread 200 that executes instructions of an instruction stream and incorporates logically non-significant operation dependent instruction decode consistent with the invention. One or more hardware threads 200 may be implemented, for example, within an IP block such as IP block 104 from FIGS. 1-4, including within a portion of XU 164 or AXU 166 thereof. In the alternative, hardware thread 200 may be implemented in other processor architectures that issue and execute instructions, including single or multi-core microprocessors or microcontrollers.

Hardware thread 200 includes decode logic 202 that receives instructions from one of more instruction streams via logic 178 or 180 and, in some embodiments, may be included in logic 178 or 180. The decode logic 202 analyzes an instruction and determines whether it corresponds to a logically non-significant operation. In general, a logically non-significant operation includes an operation that does not change data values targeted or sourced by an instruction. For example, a logically non-significant operation may be one in which zero is added to a value. Also for example, a logically non-significant operation may be one in which a value is divided by one, an operation in which a first value is both added and subtracted from a second value, or an operation in which a first value is multiplied and divided by a second value. Yet another example of a logically non-significant operation in one architecture may be to logically OR a value with itself (resulting in the same value being returned) or, in a separate architecture, to logically OR a value with an array of zero bits (resulting in the same value being returned). In any event, when the decode logic 202 detects a logically non-significant operation, it decodes a first register address of a subsequent instruction as a second, different register address.

When the decode logic 202 determines that an instruction is not a logically non-significant operation (hereinafter, "LNSO") it passes the instruction to execution logic 206 for execution thereby. When the decode logic 202 determines that an instruction is an LNSO, it may set a flag that an LNSO has been detected and send the instruction to the execution logic 206 or, alternatively, discard the instruction. When the decode logic 202 receives an instruction after receiving an LNSO (e.g., immediately after receiving an LNSO or after receiving multiple LNSOs), it decodes a register address associated with that instruction prior to sending that instruction to the execution logic 206. Specifically, the decode logic 202 decodes a first address of the instruction after an LNSO as a second, different address. In some embodiments, the decode logic 202 may add a fixed value to the first address, append a fixed value as the most significant bit(s) to the first address, or otherwise adjust the first address to generate the second address. In one embodiment, the decode logic 202 is configured to add or append a fixed value stored in an address data structure 204 based on the identification of an LNSO. As such, address data structure 204 may be configured as a counter and the decode logic 202 is configured to increment the fixed value in the address data structure 204 each time an LNSO is detected. In alternative embodiments, the decode logic 202 is configured to add or append a fixed value stored in the address data structure 204 based on the particular operational code ("opcode") used in the LNSO. As such, the address data structure 204 may be configured as a table that stores entries for various opcodes that may be used in LNSOs, and the decode logic 202 is configured to access or search through the address decode data structure 204 for an entry that matches the opcode associated with the detected LNSO, then determine the particular fixed value to add and/or append to an address to generate the second address. In a further alternative embodiment, the entry in the address data structure 204 is a second address that replaces the first address.

Execution logic 206 processes instructions provided thereto by the decode logic 202. The execution logic 206 may be implemented as a number of different types of execution logic, e.g., a fixed point unit, a floating point unit, or a specialized execution unit such as a graphics processing unit, encryption/decryption unit, coprocessor, XML processing unit, etc., and may be implemented as a vector or scalar-based unit. In addition, the execution logic 206 may be pipelined in some embodiments.

The instructions provided to the execution logic 206 include at least one opcode that specifies the operation to perform along with one or more target addresses and/or source addresses. Each source address indicates a location from which to retrieve a respective value of a register file 208 to process. Each target address indicates a location at which to write a value to the register file 208 that is a result of processing the instruction. The register file 208 may include multiple register banks 210, and in specific embodiments may include four register banks 210a-d.

Figure 6:
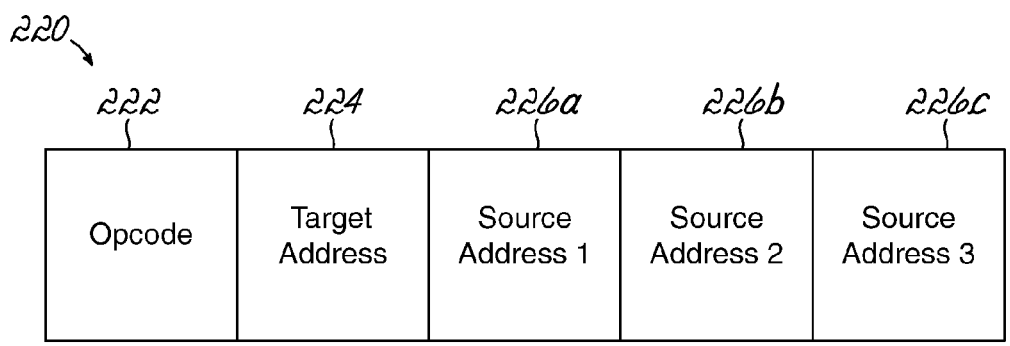
FIG. 6 is an illustration of an instruction format that may be used within the NOC of FIG. 2 that includes full target and source addresses.

With respect to instructions, FIG. 6 illustrates an exemplary instruction 220 that may be provided to the hardware thread 200, and in particular the execution logic 206 thereof. In specific embodiments, the instruction 220 includes thirty-two bits, which includes an opcode 222 having four bits, a target address 224 having seven bits, and three source addresses 226a-c each having seven bits. In specific embodiments, the seven bits for each address 224 and 226a-c allow the execution logic 206 to pull data from a register file 208 having about 128 entries, and in particular a register file 208 having four banks 210a-c of 32 entries apiece. However, this particular instruction format limits the instruction to small opcodes, large addresses, and no secondary opcode.

Figure 7:
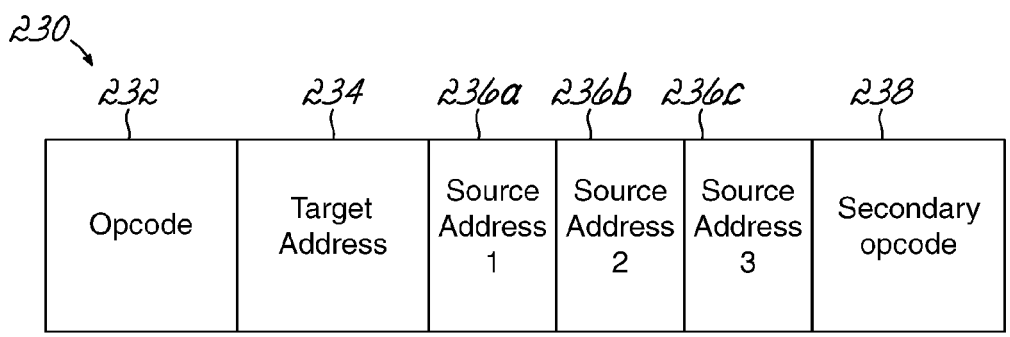
FIG. 7 is an illustration of an alternative instruction format that may be used within the NOC of FIG. 2 that includes shortened target and source addresses.

As such, the computer 10 may configured to use a reduced number of bits in the target address 224 and/or one or more source address 226a-c in order to utilize a larger number of primary opcodes and/or utilize secondary opcodes. In some embodiments, this may include decreasing the target address 224 and/or one or more source addresses 226a-c of an instruction, then inserting one or more LNSOs into the instruction stream before the adjusted instruction that, in combination, instruct the decode logic 202 how to re-adjust the target address 224 and/or one or more source addresses 226a-c. In specific embodiments, the reduced number of bits in the target address 224 and/or one or more source addresses 226a-c may include addresses in which the two most significant bits have been removed, which bits are reinserted in response to detecting an LNSO in instruction stream. Correspondingly, FIG. 7 is an exemplary instruction 230 that may be provided to the hardware thread 200. In specific embodiments, the instruction 230 includes thirty-two bits, and includes an opcode 232 having six bits. However, each of a target address 234 and/or three source addresses 236a-c may only have five bits, thus leaving as many as six bits for a secondary opcode 238. Thus, instruction 230 allows for a greater number of operations and subtypes of operations than instruction 220.

Figure 8:
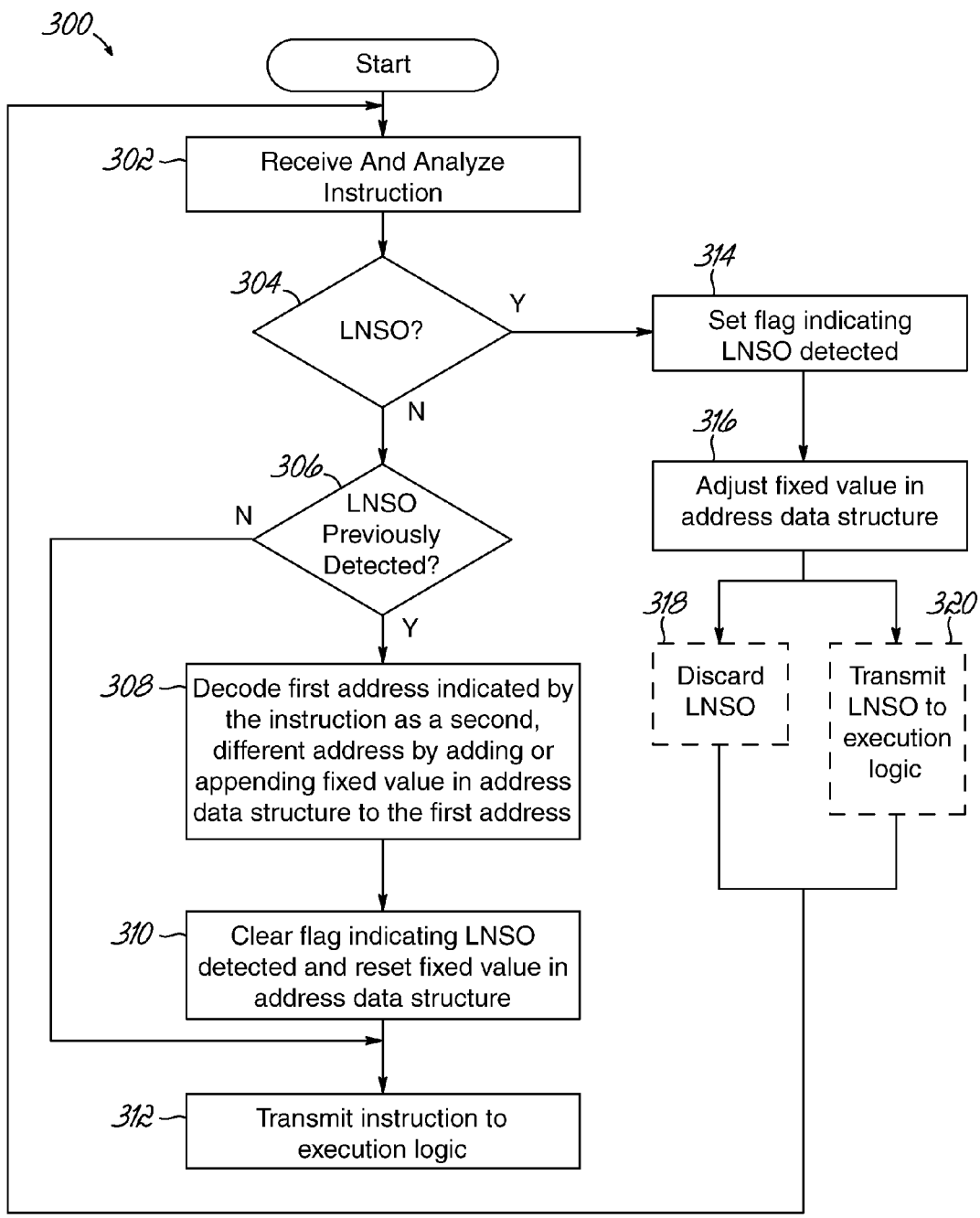
FIG. 8 is a flowchart illustrating a sequence of operations within an execution unit of FIG. 5 to detect that a first operation is a logically non-significant operation and adjust the target and/or source addresses of a second, subsequent instruction.

FIG. 8 is a flowchart 300 illustrating a sequence of operations performed by the decode logic 202 to adjust a register address of an instruction by adding or appending a fixed value from an address data structure 204 that is configured as a counter consistent with embodiments of the invention. In particular, when the decode logic 202 receives a first instruction from logic 178 or 180, it analyzes the first instruction to determine whether it is an LNSO (block 302). When the decode logic 202 detects that the first instruction is not an LNSO ("No" branch of decision block 304), the decode logic 202 determines whether an LNSO was previously detected by determining whether a flag indicating that an LNSO was previously detected is set (block 306). When the decode logic 202 determines that the flag indicating that an LNSO was previously detected is set, thus indicating that an LNSO was previously detected ("Yes" branch of decision block 306), the decode logic 202 decodes a first address indicated by the instruction as a second, different address by adding a fixed value stored in the address data structure 204 to the first address or appending, as one or more most significant bits, the fixed value stored in the address data structure 204 to the first address (block 308), then clears the flag indicating that an LNSO was detected and resets the counter in the address data structure 204 (block 310). When the decode logic 202 determines that the flag indicating that an LNSO was previously detected is not set, thus indicating that an LNSO was not previously detected ("No" branch of decision block 306), or after clearing the flag indicting that an LNSO was detected and resetting the counter in the address data structure 204 (block 310), the decode logic 202 transmits the instruction to execution logic 206 for execution thereby (block 312).

Returning to block 304, when an LNSO is detected ("Yes" branch of decision block 304), the decode logic 202 sets a flag indicating that an LNSO has been detected (block 314) and adjusts a fixed value in the address data structure 204 (block 316). In some embodiments, the decode logic 202 increments the address data structure 204 when an LNSO is detected. In an optional block the decode logic 202 discards the LNSO (block 318). Alternatively, and also in an optional block, the decode logic 202 transmits the LNSO to the execution logic 206 for execution thereby (block 320).

With reference to flowchart 300, after the operations of block 312, 318, or 320, the sequence of operations may return to block 302 to receive and analyze the next instruction of the instruction stream. Thus, when there are multiple consecutive LNSOs, the decode logic 202 may be configured to increment the fixed value in the address data structure 204 a corresponding number of times. As such, the sequence of operations of FIG. 8 may be repeated for each instruction received by the decode logic 202.

Figure 9:
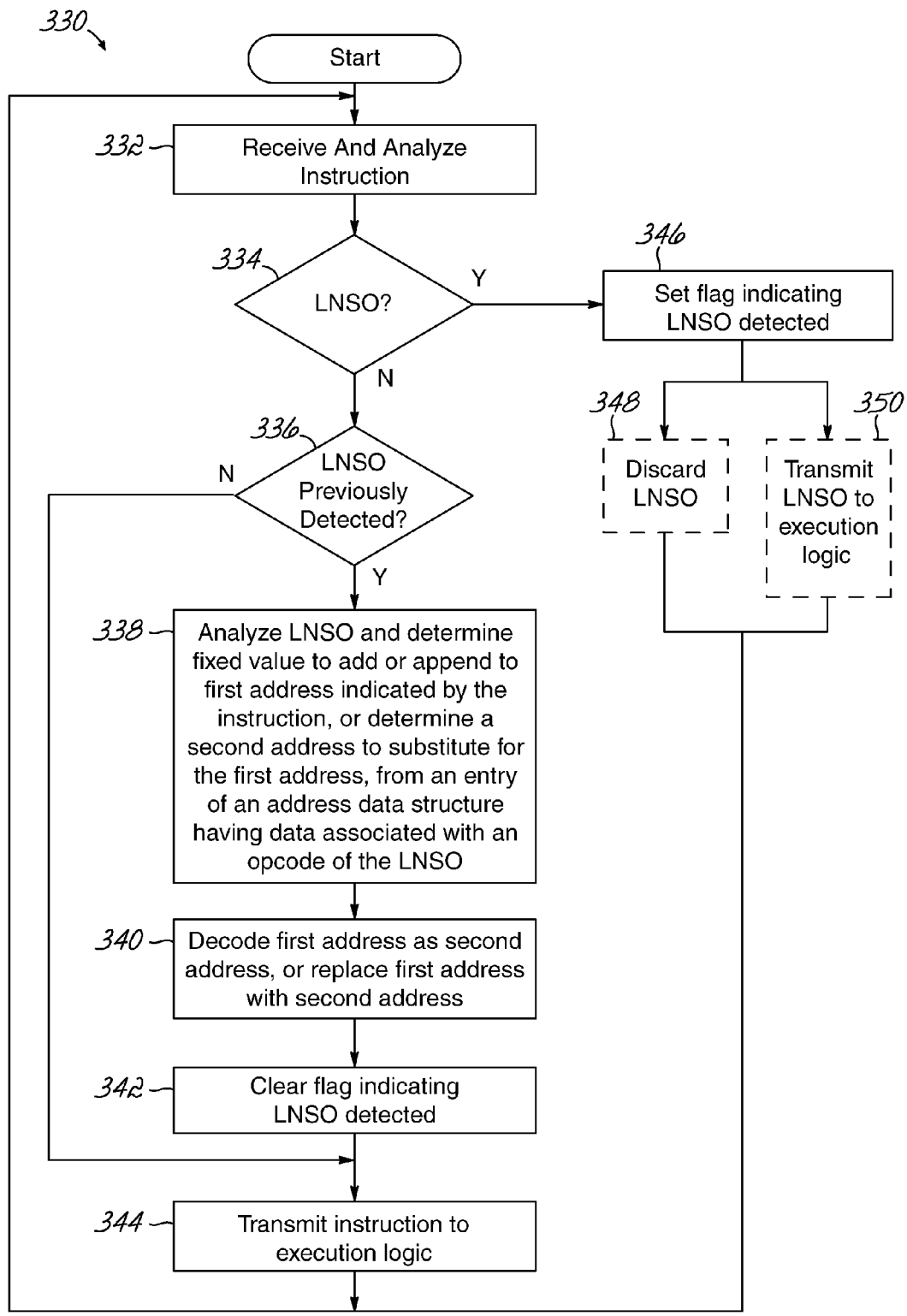
FIG. 9 is a flowchart illustrating an alternative sequence of operations within an execution unit of FIG. 5 to detect that a first operation is a logically non-significant operation and adjust the target and/or source addresses of a second, subsequent instruction.

FIG. 9 is a flowchart 330 illustrating an alternative sequence of operations performed by the decode logic 202 to adjust an address indicated by an instruction (e.g., a register address) by adding or appending a fixed value from an address data structure 204 as a table, or replacing a first address indicated by the instruction with a second address from the address data structure 204, consistent with alternative embodiments of the invention. Similarly to the flowchart 300 of FIG. 8, in the flowchart 330 of FIG. 9, the decode logic 202 receives and analyzes a first instruction to determine whether it is an LNSO (block 332). When the decode logic 202 detects that the first instruction is not an LNSO ("No" branch of decision block 334), the decode logic 202 determines whether an LNSO was previously detected by determining whether a flag indicating that an LNSO was previously detected is set (block 336). When the decode logic 202 determines that the flag indicating that an LNSO was previously detected is set, thus indicating that an LNSO was previously detected ("Yes" branch of decision block 336), the decode logic 202 analyzes the LNSO and determines how to decode the first address as a second, different address based on an opcode associated with the LNSO (block 338). The decode logic 202 determines how to decode the first address as the second address by searching through the address data structure 204 for an entry that matches the opcode associated with the LNSO. When the decode logic finds an entry that matches the opcode, it determines, from data associated with that entry, a fixed value to add to the first address to generate the second address, the fixed value to append, as one or more most significant bits, to the first address to generate the second address, or a second address intended to replace the first address (block 338). In any event, when the decode logic 202 determines how to decode the first address as the second address, or determines the second address (block 338), it decodes the first address as the second address or replaces the first address with the second address (block 340) and clears the flag indicating that an LNSO was detected (block 342). When the decode logic 202 determines that the flag indicating that an LNSO was previously detected is not set, thus indicating that an LNSO was not previously detected ("No" branch of decision block 336), or after clearing the flag indicting that an LNSO was detected (block 342), the decode logic 202 transmits the instruction to execution logic 206 for execution thereby (block 344).

Returning to block 334, when an LNSO is detected ("Yes" branch of decision block 334), the decode logic 202 sets a flag indicating that an LNSO has been detected (block 346). In an optional block the decode logic 202 discards the LNSO (block 348). Alternatively, and also in an optional block, the decode logic 202 transmits the LNSO to the execution logic 206 for execution thereby (block 350).

With reference to flowchart 330, after the operations of block 344, 348, or 350, the sequence of operations may return to block 332 to receive and analyze the next instruction of the instruction stream. As such, the sequence of operations of FIG. 9 may be repeated for each instruction received by the decode logic 202.

By way of example, an instruction stream may contain three instructions to provide to execution logic 206. The first instruction is formatted as "FMADD add1, add2, add3, add4," in which "FMADD" is the opcode, "add1" is a target address of the register file 208, while "add2," "add3," and "add4" are source addresses of the register file 208. The target address and source addresses are each configured in a first bank 210a of a register file 208. The first instruction is executed by the execution logic 206 to multiply the values stored at add3 and add4, add that result to the value at add2, and store the result at add1. The second instruction is formatted as "OR add1, add1, add1," in which "OR" is the opcode and "add1" is both the target address and two source addresses, with the second instruction executed by the execution logic 206 to OR the value at add1 with itself, then store the result of that OR at add1. The third instruction is formatted as "FMADD add1, add2, add3, add4," which is identical to the first instruction.

In this example, and consistent with embodiments of the invention, the decode logic 202 detects that the second instruction ("OR add1, add1, add1") is a logically non-significant operation, as it does not operate to change the value at either a target address or any of the source addresses, namely, the value at add1. Thus, the decode logic 202 is configured to adjust at least one address in the third instruction. In a specific embodiment, the decode logic is configured to add or append two bits in the address data structure 204 as the most significant bits of the addresses to change the targets of the addresses from a first register bank 210a of the register file 208 to a second register bank 210b of the register file 208. As a further example, the execution logic 206 may use target and source addresses from the first bank 210a when there are no bits specifying which register to use or when the most significant bits of those addresses are "00," the execution logic 206 may use target and source addresses from the second bank 210b when the most significant bits of the addresses are "01," the execution logic 206 may use target and source addresses from the third bank 210c when the most significant bits of the addresses are "10," and, correspondingly, the execution logic 206 may use target and source addresses from the fourth bank 210d when the most significant bits of the addresses are "11." As a consequence, when the decode logic 202 detects that the second instruction is a logically non-significant operation, the decode logic increment the counter of the address data structure 204, which is initially set to "00," to "01" and add 32 to the addresses of the third instruction, or append "01" as the most significant bits to the addresses of the third instruction, to decode the third instruction as "FMADD add33, add34, add35, add36," in which add33 is a target address pointing to the first entry in the second bank 210b of the register file 208, and add34, add35, and add36 are source addresses pointing to the second, third, and fourth entries in the second bank 210*b* of the register file 208.

Various modifications may be made to the disclosed embodiments without departing from the spirit and scope of the invention. Therefore, the invention lies in the claims hereinafter appended.

What is claimed is:

1. A method of executing instructions of an instruction stream, comprising:
   receiving a first instruction of the instruction stream, wherein the first instruction performs a logically non-significant operation; and
   in response to determining that the first instruction performs a logically non-significant operation based at least in part on an opcode of the first instruction and an operand of the first instruction:
      setting an indicator that indicates that the first instruction performs a logically non-significant operation, and
      decoding a first address identified by a second instruction of the instruction stream that is received subsequent to the first instruction as a second address that is different from the first address.

2. The method of claim 1, wherein decoding the first address as the second address includes:
   adding a fixed value to the first address to generate the second address.

3. The method of claim 1, wherein decoding the first address as the second address includes:
   appending a fixed value to the first address to generate the second address.

4. The method of claim 1, further comprising:
   executing the second instruction with the first address decoded as the second address.

5. The method of claim 1, wherein decoding the first address as the second address includes:
   determining the opcode associated with the first instruction; and
   determining, based on the opcode, the second address.

6. The method of claim 5, wherein determining the second address includes:
   accessing an entry in an address data structure that matches the opcode associated with the first instruction; and
   determining the second address from data associated with the entry.

7. The method of claim 1, wherein decoding the first address as the second address includes:
   determining the opcode associated with the first instruction; and
   determining, based on the opcode, a fixed value to utilize to generate the second address.

8. The method of claim 7, wherein determining the fixed value includes:
   accessing an entry in an address data structure that matches the opcode; and
   selecting the fixed value from data associated with the entry.

9. The method of claim 7, further comprising:
   generating the second address by adding the fixed value to the first address.

10. The method of claim 7, further comprising:
   generating the second address by appending the fixed value to the first address.

11. The method of claim 1, wherein the first address is a target address for the second instruction.

12. The method of claim 1, wherein the first address is a source address for the second instruction.

13. The method of claim 1, wherein the first address is associated with a first bank of a register file and the second address is associated with a second bank of the register file.

14. The method of claim 1, wherein the first instruction is determined to be a logically non-significant operation in response to determining that the first instruction logically ORs a value at a target address with itself.

15. A circuit arrangement, comprising:
   decode logic configured to:
      receive a first instruction of an instruction stream, where the first instruction performs a logically non-significant operation, and
      in response to determining that the first instruction performs a logically non-significant operation based at least in part on an opcode of the first instruction and an operand of the first instruction:
         set an indicator that indicates that the first instruction performs a logically non-significant operation, and
         decode a first address identified by a second instruction of the instruction stream that is received subsequent to the first instruction as a second address that is different from the first address in response to determining that the first instruction performs a logically non-significant operation; and
   execution logic coupled to the decode logic and configured to execute the second instruction with the first address decoded as the second address.

16. The circuit arrangement of claim 15, wherein the decode logic is further configured to add a fixed value to the first address to generate the second address.

17. The circuit arrangement of claim 15, wherein the decode logic is further configured to append a fixed value to the first address to generate the second address.

18. The circuit arrangement of claim 15, wherein the decode logic is further configured to determine the opcode associated with the first instruction and determine, based on the opcode, the second address.

19. The circuit arrangement of claim 18, wherein the decode logic is further configured to access an entry in an address data structure that matches the opcode associated with the first instruction and determine the second address from data associated with the entry.

20. The circuit arrangement of claim 15, wherein the decode logic is further configured to determine the opcode associated with the first instruction and determine, based on the opcode, a fixed value to utilize to generate the second address.

21. The circuit arrangement of claim 20, wherein the decode logic is further configured to access an entry in an address data structure matches the opcode and select the fixed value from data associated with the entry.

22. The circuit arrangement of claim 20, wherein the decode logic is further configured to generate the second address by adding the fixed value to the first address.

23. The circuit arrangement of claim 20, wherein the decode logic is further configured to generate the second address by appending the fixed value to the first address.

24. The circuit arrangement of claim 15, further comprising:
   a register file having a plurality of register banks,
   wherein the first address is associated with a first bank of the register file and the second address is associated with a second bank of the register file.

25. A program product comprising a computer readable medium and logic definition program code resident on the computer readable medium and defining the circuit arrangement of claim 15.

* * * * *